(12) United States Patent
Svensson

(10) Patent No.: US 10,293,412 B2
(45) Date of Patent: May 21, 2019

(54) CHUCK ARRANGEMENT

(71) Applicant: Bo Karl Ragnar Svensson, Stockholm (SE)

(72) Inventor: Bo Karl Ragnar Svensson, Stockholm (SE)

(73) Assignee: M.P.C.-System AB, Stockholm (SE)

( * ) Notice: Subject to any disclaimer, the term of this patent is extended or adjusted under 35 U.S.C. 154(b) by 0 days.

(21) Appl. No.: 15/566,450

(22) PCT Filed: Mar. 21, 2016

(86) PCT No.: PCT/SE2016/050230
§ 371 (c)(1),
(2) Date: Oct. 13, 2017

(87) PCT Pub. No.: WO2016/171599
PCT Pub. Date: Oct. 27, 2016

(65) Prior Publication Data
US 2018/0117682 A1   May 3, 2018

(30) Foreign Application Priority Data
Apr. 21, 2015   (SE) ...................................... 1550472

(51) Int. Cl.
*B23B 31/16*   (2006.01)
(52) U.S. Cl.
CPC .. *B23B 31/16279* (2013.01); *B23B 31/16275* (2013.01); *Y10T 279/19* (2015.01); *Y10T 279/1986* (2015.01)
(58) Field of Classification Search
CPC .......... B23B 31/1627; B23B 31/16275; B23B 31/16279; Y10T 279/19; Y10T 279/1986
See application file for complete search history.

(56) References Cited

U.S. PATENT DOCUMENTS

| 2,950,117 | A |   | 8/1960 | Walmsley |
| 3,179,430 | A | * | 4/1965 | Zierden ............. B23B 31/16012 279/123 |

(Continued)

FOREIGN PATENT DOCUMENTS

| DE | 19919403 A1 | 5/2000 |
| EP | 0662363 A1 | 7/1995 |

(Continued)

OTHER PUBLICATIONS

International Search Report from corresponding International Patent Application No. PCT/SE2016/050230, dated May 24, 2016.

*Primary Examiner* — Eric A Gates
(74) *Attorney, Agent, or Firm* — Tucker Ellis LLP

(57) ABSTRACT

Backing and clamping chuck jaw part (110, 120), respectively, arranged to engage with each other such that respective contact surfaces (113, 123) a rearranged to come into contact with each other so as to together form a chuck jaw (100) for a chuck (10). The invention is characterized in that the backing chuck jaw part is manufactured from a harder metal material than a metal material from which the clamping chuck jaw part is manufactured, in that a the backing chuck jaw part comprises a convex structure (126), and in that the convex structure is arranged to engage with a corresponding concave structure (116) of the clamping chuck jaw part so that the said concave structure is permanently deformed as a result of an engagement between said structures resulting from the chuck jaw parts first being arranged in a contacting orientation and thereafter being pressed together into an engagement orientation, in which contact is established between said contact surfaces. The invention also relates to a chuck jaw, a chuck and a method.

21 Claims, 10 Drawing Sheets

(56) References Cited

U.S. PATENT DOCUMENTS

| | | | | |
|---|---|---|---|---|
| 4,556,228 A | * | 12/1985 | Ferraro | B23B 31/16279 |
| | | | | 279/123 |
| 4,706,973 A | | 11/1987 | Covarrubias | |
| 5,155,898 A | * | 10/1992 | Gutierrez | B23B 31/16275 |
| | | | | 279/154 |
| 5,195,760 A | * | 3/1993 | Wheeler | B23B 31/1253 |
| | | | | 279/60 |
| 5,314,317 A | * | 5/1994 | Abe | B23B 31/19 |
| | | | | 279/123 |
| 5,664,793 A | * | 9/1997 | Engibarov | B23B 31/16279 |
| | | | | 279/124 |
| 8,152,175 B1 | * | 4/2012 | Maro | B23B 31/16275 |
| | | | | 279/110 |
| 9,333,562 B2 | * | 5/2016 | Svensson | B23B 31/16279 |

FOREIGN PATENT DOCUMENTS

| | | | | |
|---|---|---|---|---|
| GB | 1374074 A | * | 11/1974 | B23B 31/12 |
| GB | 2143163 A | | 2/1985 | |
| KR | 20150088051 A | * | 7/2015 | |
| WO | 9526248 A1 | | 10/1995 | |
| WO | 2013/015736 A1 | | 1/2013 | |

\* cited by examiner

CHUCK ARRANGEMENT

The present invention relates to a chuck arrangement. More specifically, the invention relates to a backing and a clamping chuck jaw part, respectively, as well as to a chuck jaw comprising such chuck jaw parts and a chuck comprising such chuck jaws.

Chucks are used in many applications, in particular for holding a rotating workpiece, such as in a lathe, a CNC machine or the like. In particular in CNC machines, it is of crucial importance that the chuck jaws of a chuck can be positioned and held in a predetermined position with high accuracy, in order to predictably clamp a workpiece in an intended position and with an intended pressure. In order to address this problem, solutions such as the one presented in PCT/SE2012/050839 have been presented, in which the chuck jaws are individually configurable to hold the workpiece in a particular predetermined way with high accuracy.

The problem of positioning of the chuck jaws also applies to the situation in which the workpiece is loosened and reclamped, or when the workpiece is replaced for a new workpiece.

Chuck jaws for CNC machine chucks may comprise a replaceable part, in the following denoted a "clamping chuck jaw part", in the art sometimes referred to as a "soft jaw", arranged to contact the workpiece. As such, they are often wear parts and therefore need to be replaced from time to time.

One particular problem is that, once a particular workpiece is loosened and reclamped, the respective position of the chuck jaws needs to be reconfigured, which is time consuming and prone to errors.

These problems are furthermore relevant for indexable chuck jaws, in other words chuck jaws that can be set into different predetermined fixed settings, for instance for clamping at different radii from a central axis of the chuck. Such indexing can be achieved by the clamping chuck jaw part being rotatable.

The present invention solves the above described problems.

Hence, the invention relates to a backing chuck jaw part having a first central axis and a contact surface perpendicular to said first central axis, which backing chuck jaw part is arranged to engage with a clamping chuck jaw part having a second central axis, in which engagement the contact surface is arranged in contact with a corresponding contact surface on said clamping chuck jaw part so as to together form a chuck jaw for a chuck, which backing chuck jaw part is characterised in that the backing chuck jaw part is manufactured from a harder metal material than a metal material from which the clamping chuck jaw part is manufactured, in that a cross-section of the backing chuck jaw part along said first central axis comprises a convex structure, and in that the convex structure is arranged to engage with a corresponding concave structure of a cross-section along said second central axis of the clamping chuck jaw part so that the said concave structure is permanently deformed as a result of an engagement between said convex and said concave structures resulting from the backing and clamping chuck jaw parts first being arranged in a contacting orientation, in which the first and second central axes, respectively, are aligned with each other and the respective contact surfaces are facing each other, and thereafter being pressed together into an engagement orientation, in which contact is established between said contact surfaces.

The invention also relates to a clamping chuck jaw part having a second central axis and a contact surface perpendicular to said second central axis, which clamping chuck jaw part is arranged to engage with a backing chuck jaw part having a first central axis, in which engagement the contact surface is arranged in contact with a corresponding contact surface on said backing chuck jaw part so as to together form a chuck jaw for a chuck, which clamping chuck jaw part is characterised in that the backing chuck jaw part is manufactured from a harder metal material than a metal material from which the clamping chuck jaw part is manufactured, in that a cross-section of the clamping chuck jaw part along said second central axis comprises a concave structure, and in that the concave structure is arranged to engage with a corresponding convex structure of a cross-section along said first central axis of the backing chuck jaw part so that the said concave structure is arranged to be permanently deformed as a result of an engagement between said convex and said concave structures resulting from the backing and clamping chuck jaw parts first being arranged in a contacting orientation, in which the first and second central axes, respectively, are aligned with each other and the respective contact surfaces are facing each other, and thereafter being pressed together into an engagement orientation, in which contact is established between said contact surfaces.

Furthermore, the invention relates to a method for operating a chuck, which method is characterised in that the method comprises the steps a) providing said at least two backing chuck jaw parts on the chuck; b) providing said at least two clamping chuck jaw parts, the respective concave structure of which has not yet been permanently deformed as a consequence of engagement with a backing chuck jaw part; c) mounting said clamping chuck jaw parts on said backing chuck jaw parts, and bringing the respective chuck jaw parts into respective engagement with their respective contact surfaces in direct contact with each other so that the said respective concave structure is permanently deformed by the corresponding convex structure of the respective backing chuck jaw part; d) clamping a workpiece using the chuck; e) releasing the workpiece; f) demounting the clamping chuck jaw parts from the backing chuck jaw parts; g) again mounting the clamping chuck jaw parts on the same respective backing chuck jaw parts; and h) again clamping the same or another workpiece using the chuck.

In the following, the invention will be described in detail, with reference to exemplifying embodiments of the invention and to the enclosed drawings, wherein.

Figure 1:
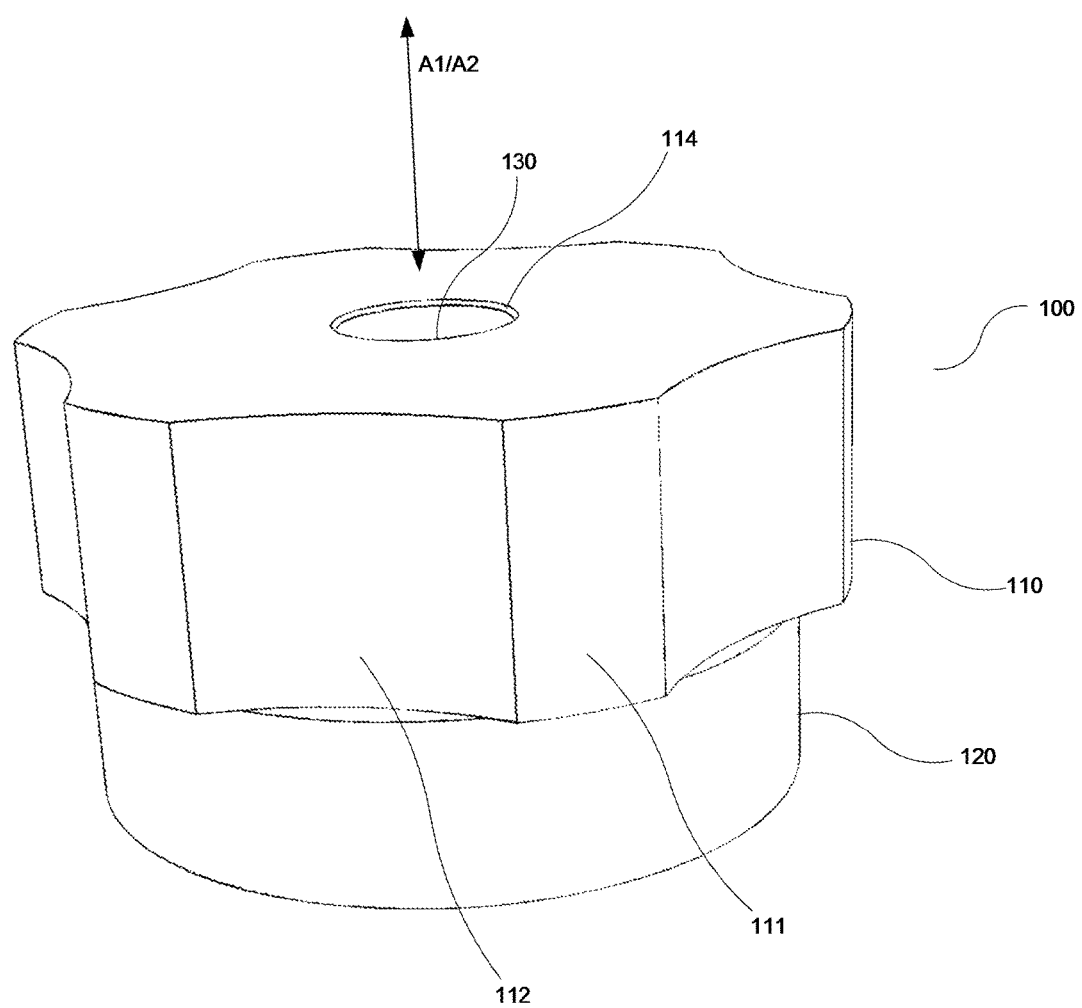
FIG. 1 is a perspective view from the top of a chuck jaw according to the present invention.
Figure 2:
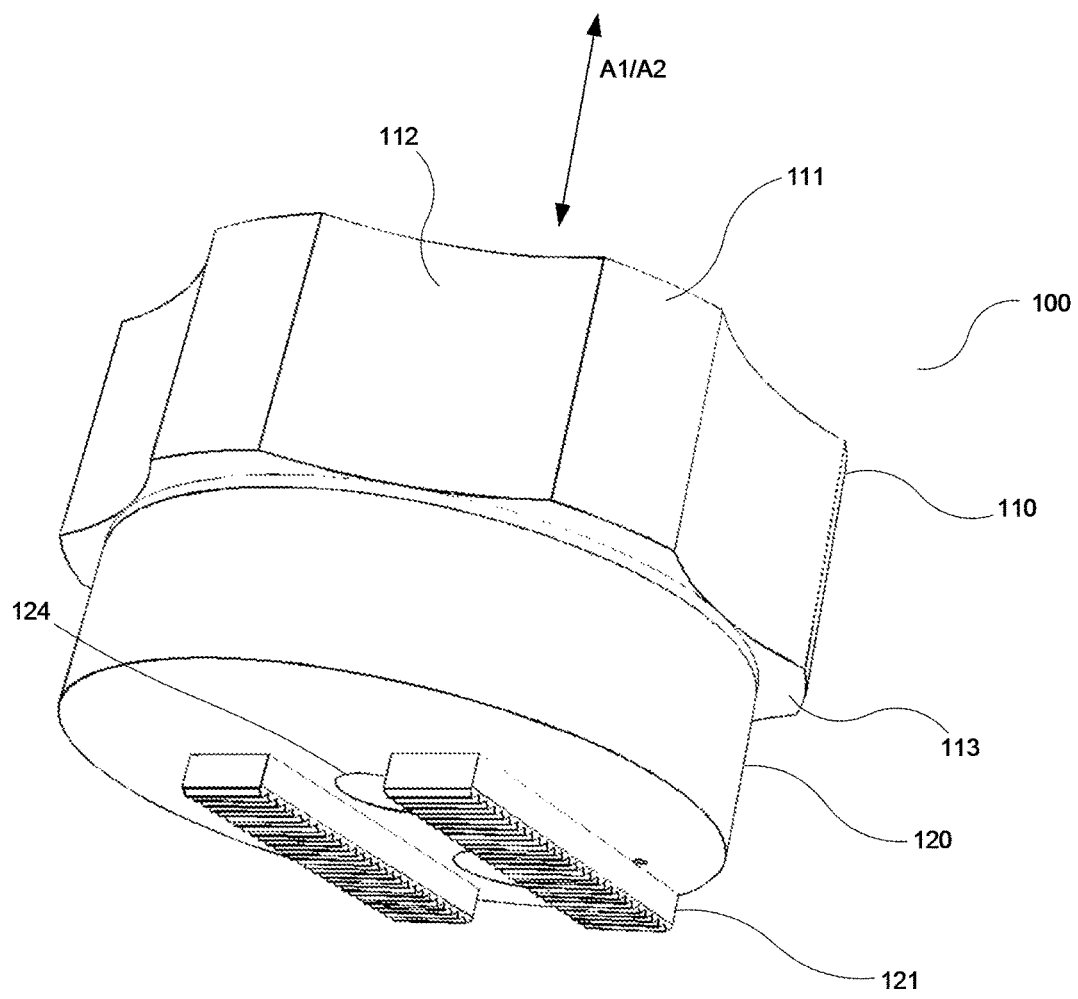
FIG. 2 is a perspective view from the bottom of the chuck jaw of FIG. 1.
Figure 3:
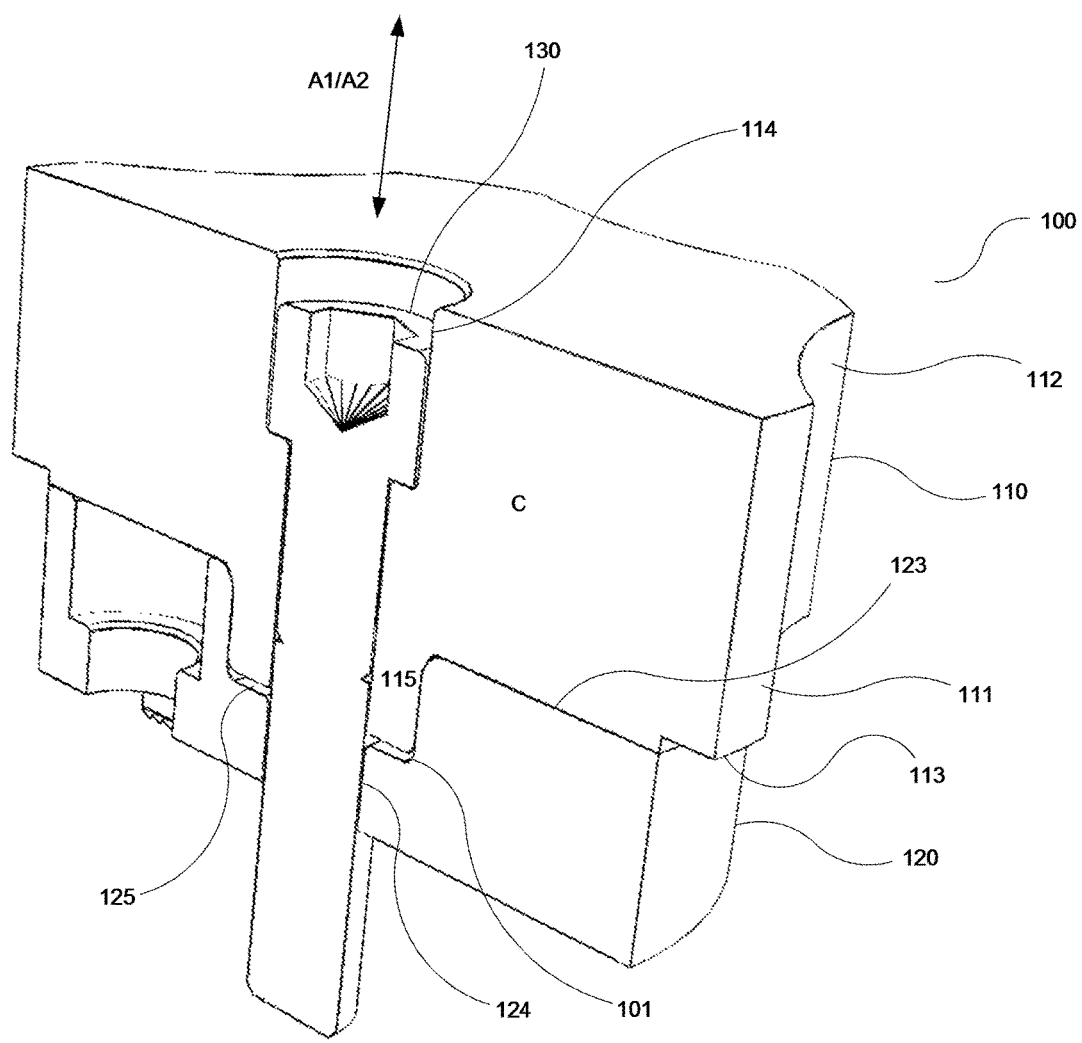
FIG. 3 is a perspective view similar to the one shown in FIG. 1, but with a cross-section removed.
Figure 4:
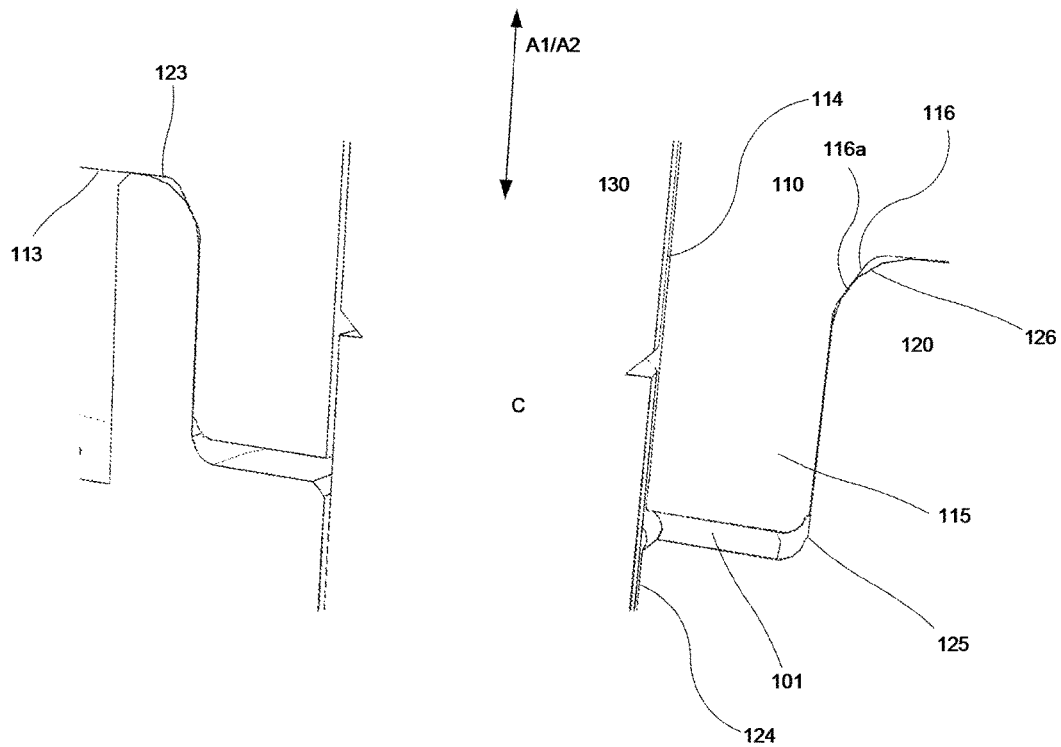
FIG. 4 shows the chuck jaw of FIG. 3, with the same cross-section removed, in a detail perspective view.
Figure 5:
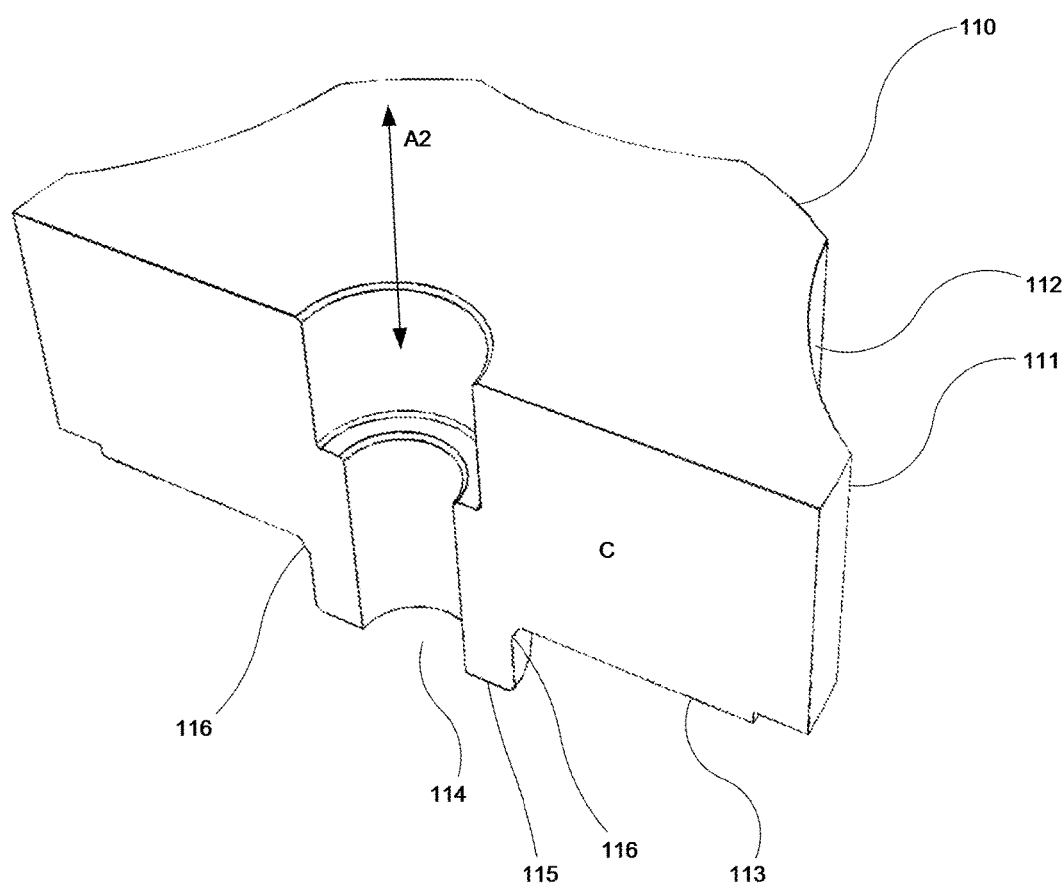
FIG. 5 is a perspective view from above of a clamping chuck jaw part according to the present invention with said cross-section removed.
Figure 6:
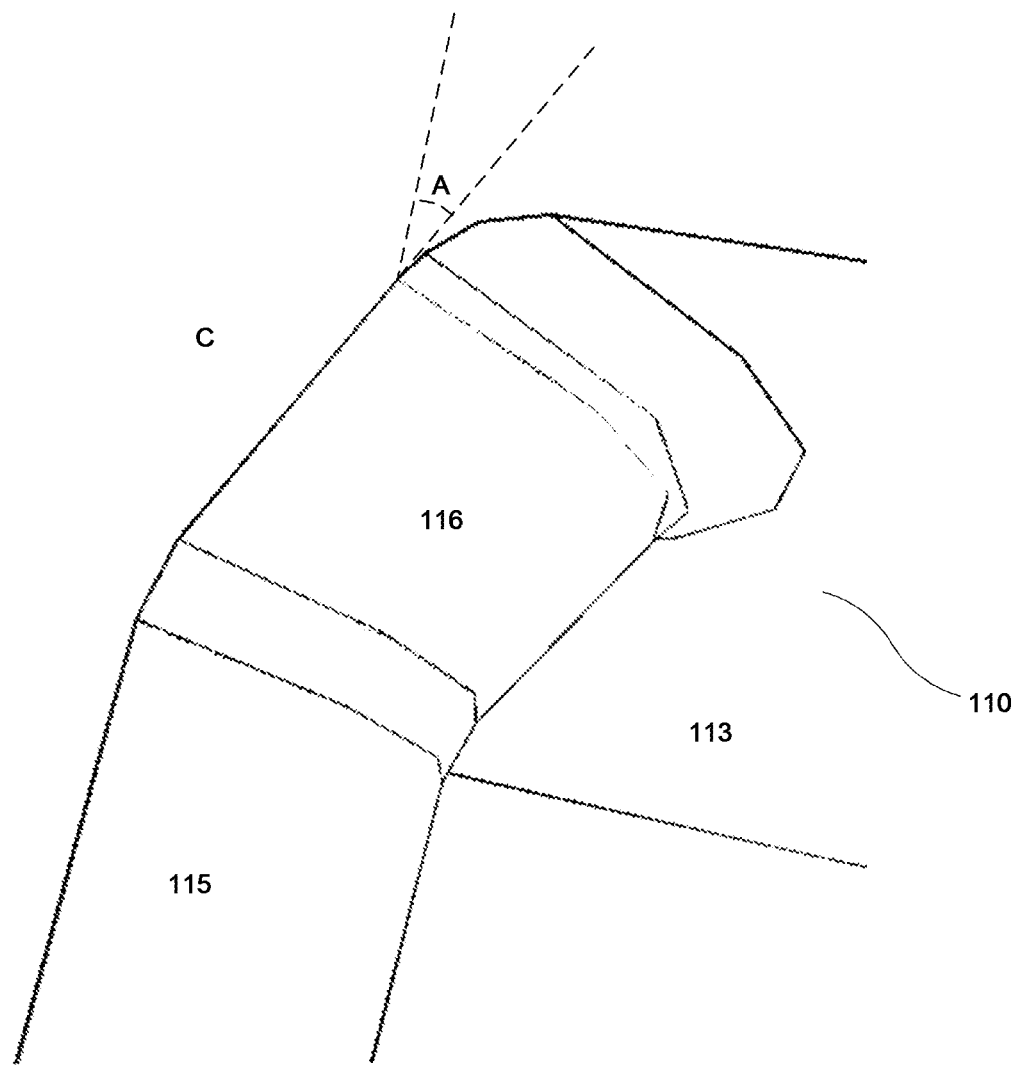
FIG. 6 is a detail perspective view from below showing the clamping chuck jaw part of FIG. 5.

All figures show the same chuck, chuck jaw and chuck jaw parts, respectively, from different angles and with different component parts removed and/or with the same cross-section removed. Furthermore, all figures share the same set of reference numerals.

In the following description, it is referred to all FIGS. 1-9 as applicable.

A chuck 10 according to the present invention comprises a number of chuck jaws 100, which may or may not be identical and are used to clamp a workpiece 12 from one respective radial direction of the chuck 10 each. Each chuck jaw 100 may comprise a backing chuck jaw part 120 and a clamping chuck jaw part 110. The backing chuck jaw part 120 is fastened to a main body 11 of the chuck 10. The clamping chuck jaw part 110 is fastened to the respective backing chuck jaw part 120 and contacts the workpiece 12 when clamping the latter.

According to the invention, the backing chuck jaw part 120 has a first central axis A1 and a contact surface 123 perpendicular to the first central axis A1. Furthermore, according to the invention the backing chuck jaw part 120 is arranged to engage with a respective clamping chuck jaw part 110 according to the invention, which has a second central axis A2 and a respective contact surface 113 which is perpendicular to the second central axis A2.

Figure 9:
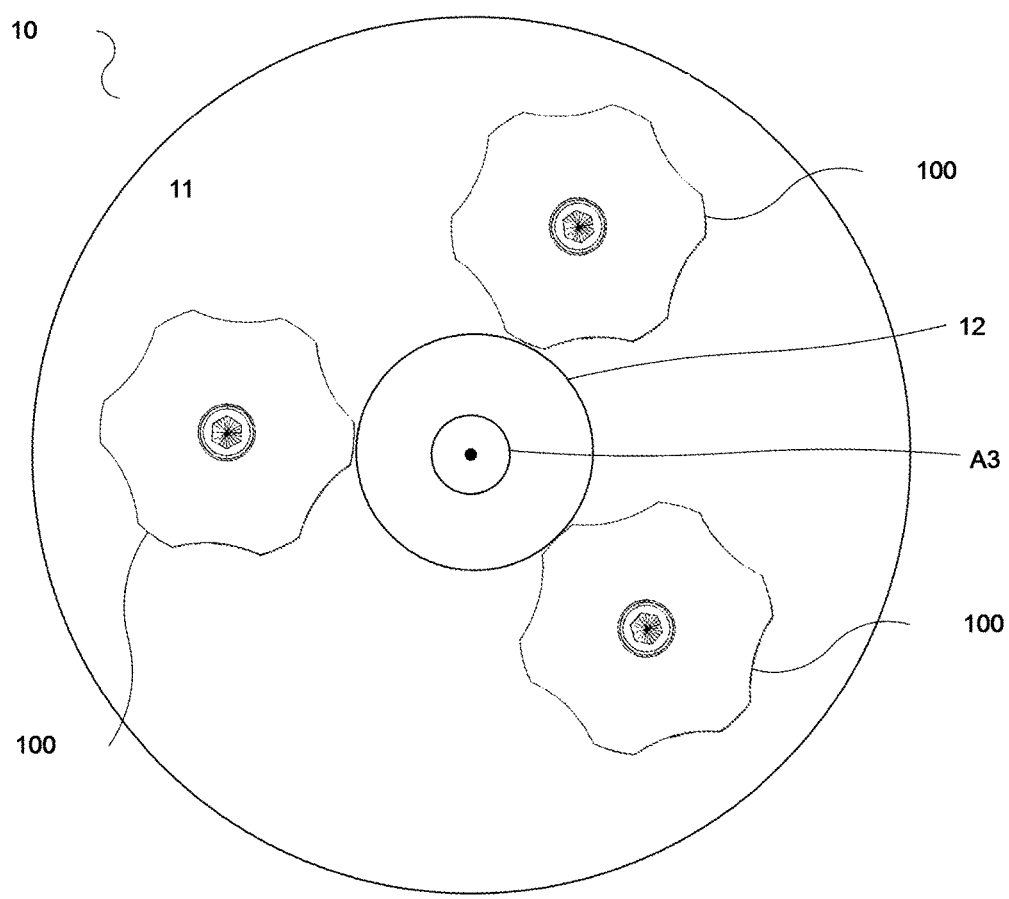
FIG. 9 is a top view of a chuck according to the present invention.

In the said engagement between the two respective chuck jaw parts 110, 120, the contact surface 123 is arranged in contact with the corresponding contact surface 113, so that the backing chuck jaw part 120 together with the clamping chuck jaw part 110 forms a chuck jaw 100 according to the invention for use as a part of a chuck 10 according to the invention (see in particular FIG. 9).

Further according to the invention, the backing chuck jaw part 120 is manufactured from a harder metal material than a metal material from which the clamping chuck jaw part 110 is manufactured.

Moreover, there is defined firstly a contacting orientation of the clamping chuck jaw part 110 with respect to the backing chuck jaw part 120, as well as an engagement orientation of the clamping chuck jaw part 110 with respect to the backing chuck jaw part 120. In both these orientations, the said first A1 and second A2 axes are aligned and preferably overlapping, and the said contact surfaces 113, 123 face each other, and are preferably parallel one to the other.

Secondly, there is defined a cross-section C of the chuck jaw 100, and hence of both the backing 120 and the clamping 110 chuck jaw parts, when in said contacting orientation as well as when in said engagement orientation. The cross-section C runs along said first A1 and second A2 axes in said contacting and engagement orientations, in other words the axis A1, A2 both extend within the cross-section C plane. The cross-section C illustrated in the figures constitutes an example of such a cross-section.

Then, according to the invention, the cross-section C of the backing chuck jaw part 120 comprises a convex structure 126 and the cross-section C of the clamping chuck jaw part 110 comprises a corresponding concave structure 116. To be clear, the convex structure 126 is a two-dimensional geometric structure generated by a corresponding three-dimensional structure which is part of the backing chuck jaw part and which, when seen in the said cross-section C, generates the convex structure 126. As such, the said three-dimensional structure may very well be, and preferably is, a convex structure as well, at least locally convex. The corresponding is true regarding the structure 116 or the clamping chuck jaw part 110, but with concave two- and three-dimensional structures instead of convex ones.

In the above mentioned contacting orientation, the convex structure 126 and the concave structure 116 preferably come into direct contact with each other, thus stopping the chuck jaw parts 110, 120 from moving further towards each other along the axes A1, A2 without using a certain force strong enough to result in permanent deformation of the material forming the concave structure 116.

When a pressing force is applied to the chuck jaw parts 110, 120, pressing them towards one another from the said contacting orientation along the axes A1, A2, the concave structure 116 is permanently deformed as a result of the engagement between the convex structure 126 and the concave structure 116. In other words, a permanent dent, track or the like is formed in the relatively softer material of the concave structure 116 by the convex structure 126 pressing against a surface 116a of the concave structure 116. When the contact surfaces 113, 123 are fully pressed together so that contact is established between them, the engagement orientation has been achieved.

Since the deformation of the clamping chuck jaw part 110 is permanent, when the clamping chuck jaw part 110 is detached from the backing chuck jaw part 120, from the said engagement orientation, and then re-attached at a later point in time, no or only very limited pressure will be required to again arrange the chuck jaw parts 110, 120 in the engagement orientation. Furthermore, it is preferred that the geometry of the convex structure 126 in combination with the geometry of the concave structure 116 is arranged so that the chuck jaw parts 110, 120, when again being brought together along the axes A1, A2 with the contact surfaces 113, 123 facing each other, again end up in the engagement orientation in a predictable manner, for instance by using guides (providing full predictability in three directions) or by having circular symmetric structures 116, 126 (see below) (providing predictability in two directions but variability along a rotational direction).

As a result, a chuck jaw 100 according to the invention will predictably provide the same, or selectively partially the same, clamping geometry in relation to a workpiece 12 even after removal and reinstallation of the clamping chuck part device 110. It is even possible to use the same backing chuck jaw part 120 with several different clamping chuck jaw parts 110 with the result that one and the same clamping chuck jaw part 110 predictably yields a desired clamping geometry every time it is used. Consequently, there is no longer any need for recalibration of clamping chuck jaw parts 110.

In particular, the fact that the two contact surfaces 113, 123 have contact in the said engagement orientation provides excellent axial precision of the chuck jaw 100.

According to a preferred embodiment, the backing chuck jaw part 120 is manufactured from annealed steel having a hardness of at least 500 HB, preferably between 550 and 600 HB. Herein, "HB" relates to the standard Brinell hardness number. It is at least the surface part, exposed to the engagement described herein, which is made from such material. The corresponding is true regarding the clamping chuck jaw part 110.

The clamping chuck jaw part 110, on the other hand, is preferably either manufactured from a steel alloy having a hardness of at the most 250 HB, preferably between 100 and 250 HB, or from an aluminium alloy having a hardness of at the most 150 HB, preferably at the most 100 HB, preferably between 75 and 150 HB.

As mentioned above and as illustrated in the figures, it is preferred that both the convex structure 126 and the concave structure 116, respectively, is rotationally symmetric about the first A1 and second A2 central axis, respectively. It is, however, possible that the convex 126 and/or concave 116 structure is or are only partly rotationally symmetric, such as comprising convex or concave circular sections interrupted by straight corners, or the like, depending on the particular indexing needs.

Such complete or part-wise symmetry achieves that the said permanent material deformation also becomes rotationally symmetric about the second central axis A2, and as a result the clamping chuck jaw part 110 can be rotated about the first axis A1 and in relation to the backing chuck jaw part 120 while still achieving full contact between the convex 126 and the concave 116 structures when in the engagement orientation at different rotational angles. This provides predictable and accurate clamping orientation for an indexable clamping chuck jaw part 110.

Namely, it is preferred that the chuck jaw 100 is indexed, so that said engagement between the chuck jaw parts 110, 120 is arranged so that the clamping chuck jaw part 110 can be turned in relation to the backing chuck jaw part 120 about the second central axis A2, so as to assume one of a number of predetermined rotational positions, and that the clamping chuck jaw part 110 is arranged with different clamping radii for different ones of said rotational positions. Such different clamping radii are illustrated in the figures, in which the clamping chuck jaw part 110 comprises sections 111 with larger radius and sections 112 with smaller radius.

According to a preferred embodiment illustrated in the figures, the convex structure 126 comprises an edge, preferably an edge which is at least partly circular symmetric about the first axis A1, with a radius of curvature of between 1 and 5 mm, preferably of between 2 and 3 mm, preferably of about 2.5 mm.

According to a further preferred embodiment, the concave structure 116 comprises a surface 116a, preferably a conical surface, which is inclined in relation to the second central axis A2, preferably with an angle of inclination A, between an axis which is parallel to the second central axis A2 and the surface 116a, of between 15° and 40°, so that the convex structure 126 strikes the said surface 116a when the chuck jaw parts 110, 120 are brought into said contact orientation. This embodiment is particularly useful in combination with the edge with certain curvature radius, as described above.

According to one preferred embodiment, the clamping chuck jaw part 110 is manufactured from a steel alloy, such as the one described above, in which case the angle of inclination A is between 18° and 26°, preferably about 22°. According to an alternative embodiment, the clamping chuck jaw part 110 is manufactured from an aluminium alloy, such as the one described above, in which case the angle of inclination is between 26° and 34°, preferably about 30°. Preferably, the surface 116a is straight or substantially straight as seen in the cross-section C.

As further illustrated in the figures, it is preferred that the backing chuck jaw part 120 comprises an indentation 125, which is preferably rotationally symmetric about the first central axis A1, and the clamping chuck jaw part 110 comprises a corresponding protrusion 115, which is preferably rotationally symmetric about the second central axis A2. Then, it is preferred that an envelope surface of the said indentation 125 is arranged to come into direct contact with a corresponding envelope surface of the said protrusion 115 when the chuck jaw parts 110, 120 are in the said engagement orientation, preferably in a way so that the relative position of the clamping chuck jaw part 110 in relation to the backing chuck jaw part 120, in a plane perpendicular to the second central axis A2, is locked when the chuck jaw parts 110, 120 are in said engagement orientation. This provides for excellent radial precision of the achieved clamping action.

According to a particularly preferred embodiment, when the said envelope surfaces are rotational symmetric about the respective first A1 and second A2 central axis, the said envelope surfaces are arranged to come into direct contact along their entire respective angular extent when the chuck jaw parts 110, 120 are in the said engagement orientation. This is a simple yet robust way to achieve the said radial precision.

In particular, it is preferred that the said indentation 125 has a conical shape, narrowing from the contact surface 123 inwards, and that the protrusion 115 has a correspondingly conical shape, so that said full direct contact is established as the chuck jaw parts 110, 120 are pressed together into the said engagement orientation.

Preferably, the said convex structure 126 is constituted by an outer delimiting edge of said indentation 125. Correspondingly, it is preferred that the said concave structure 116 is constituted by an inner base corner of the said protrusion 115.

In an alternative embodiment, the indentation 125 and the corresponding protrusion 115 are not conical, but cylindrical. This makes production simpler.

According to a preferred embodiment, the chuck jaw parts 110, 120 are geometrically arranged so that a certain play, of between 0.05 and 0.25 mm, preferably between 0.10 and 0.15 mm, most preferably about 0.12 mm, is present between the said contact surfaces 113, 123 when the chuck jaw parts 110, 120 are arranged in said contact orientation. Consequently, it is this play which is then lessened and finally eliminated as the chuck jaw parts 110, 120 move from the contacting orientation to the engagement orientation by force. Tests have shown that a play of this magnitude provides a sufficient permanent deformation in order to provide high precision in a predictable way, while still being able to easily move the chuck jaw parts 110, 120 into the engagement orientation during the first time of installation.

Furthermore, it is preferred that the chuck jaw 100 also comprises a screw means 130, arranged to impart the force pressing the chuck jaw parts 110, 120 towards each other into the engagement orientation. The screw means 130 preferably runs in a centrally arranged through hole 114 of the clamping chuck jaw part 110, which through hole 114 is provided with a shoulder, and is fastened in a corresponding, threaded, central through hole 124 of the backing chuck jaw part 120, thereby pulling the chuck jaw parts 110, 120 together. The chuck jaw 100 is then preferably arranged so that a screw means 130 moment of between 60-90 NM, preferably between 70-75 NM, is required for the said contact to be established. Tests have proven that this provides an adequate permanent material deformation while at the same time providing a reasonable work ergonomics and minimized risk of undesired material damage.

Hence, a chuck jaw 100 according to the invention comprises a backing chuck jaw part 120 as described above, and a clamping chuck jaw part 110 also as described above. Furthermore, a chuck 10 according to the present invention preferably comprises at least two, preferably at least three, such chuck jaws 100, and is further associated with a third central axis A3 (out from paper in FIG. 9). Preferably, the chuck 10 further comprises a respective radial setting means (illustrated schematically as 121) for each respective chuck jaw 100, arranged to act on the backing chuck jaw part 120 of the chuck jaw 100 in question and allow it to be set radially in relation to said third central axis A3 to a desired location in relation to the clamped workpiece 12.

It is noted that FIGS. 1-4 illustrate the above described engagement orientation of the chuck jaw parts 110, 120, in which the contact surfaces 113, 123 are in full contact. It is preferred that there is a play 101 in this case, of at least 1 mm, between an end of the above described protrusion 115 and a bottom of the above described indentation 125.

Figure 7:
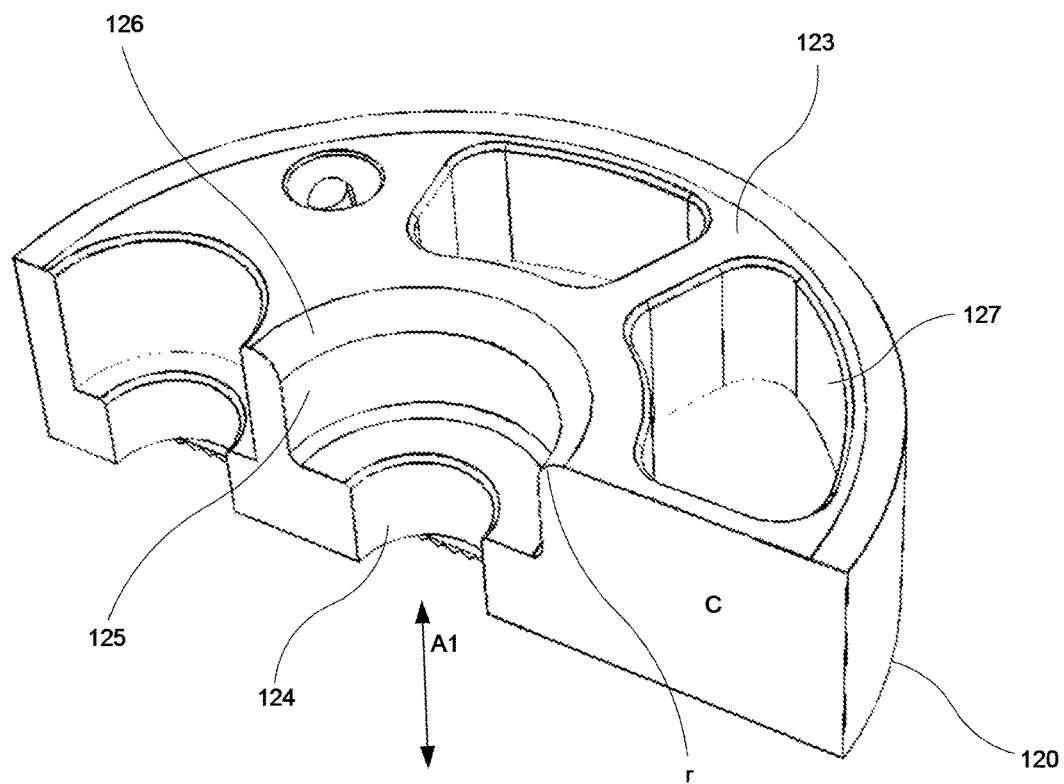
FIG. 7 is a perspective view from above of a backing chuck jaw part according to the present invention with said cross-section removed.
Figure 8:
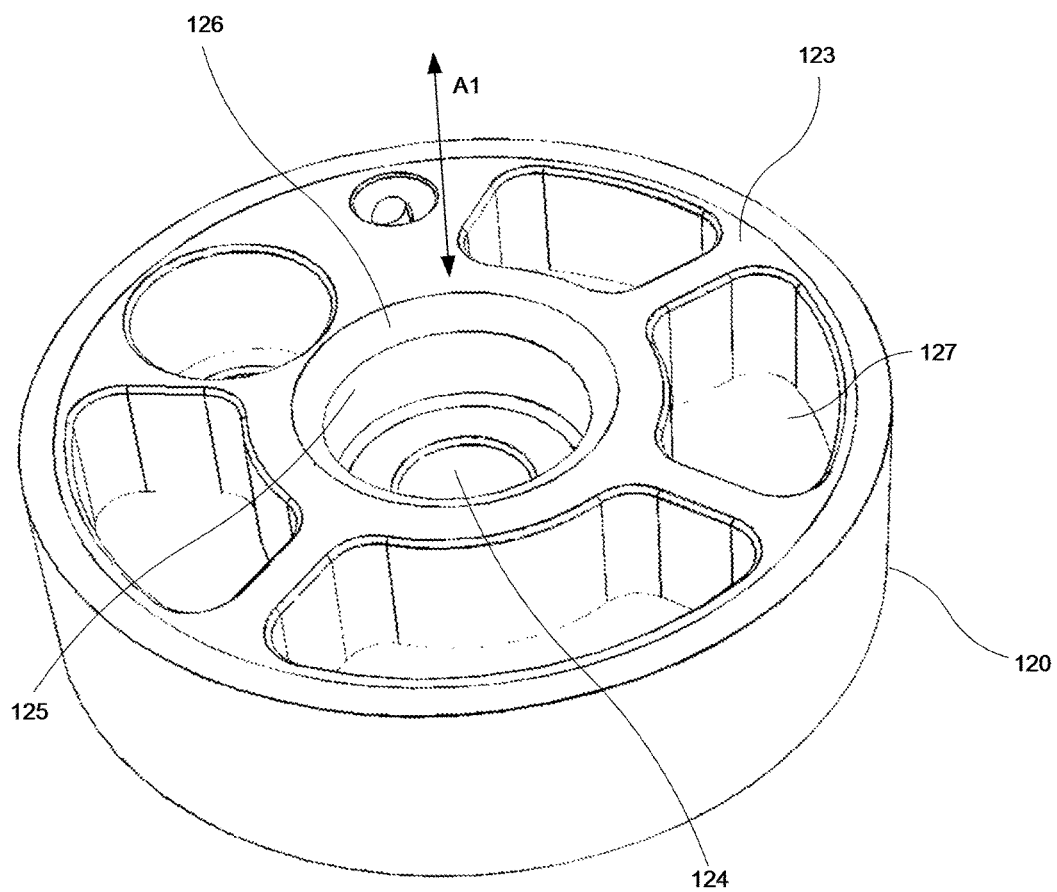
FIG. 8 is a view which is similar to the one shown in FIG. 7, but without any removed cross-section.

FIGS. 7 and 8 also show areas 127 of removed material, in order to decrease the weight of the backing chuck jaw part 120.

Figure 10:
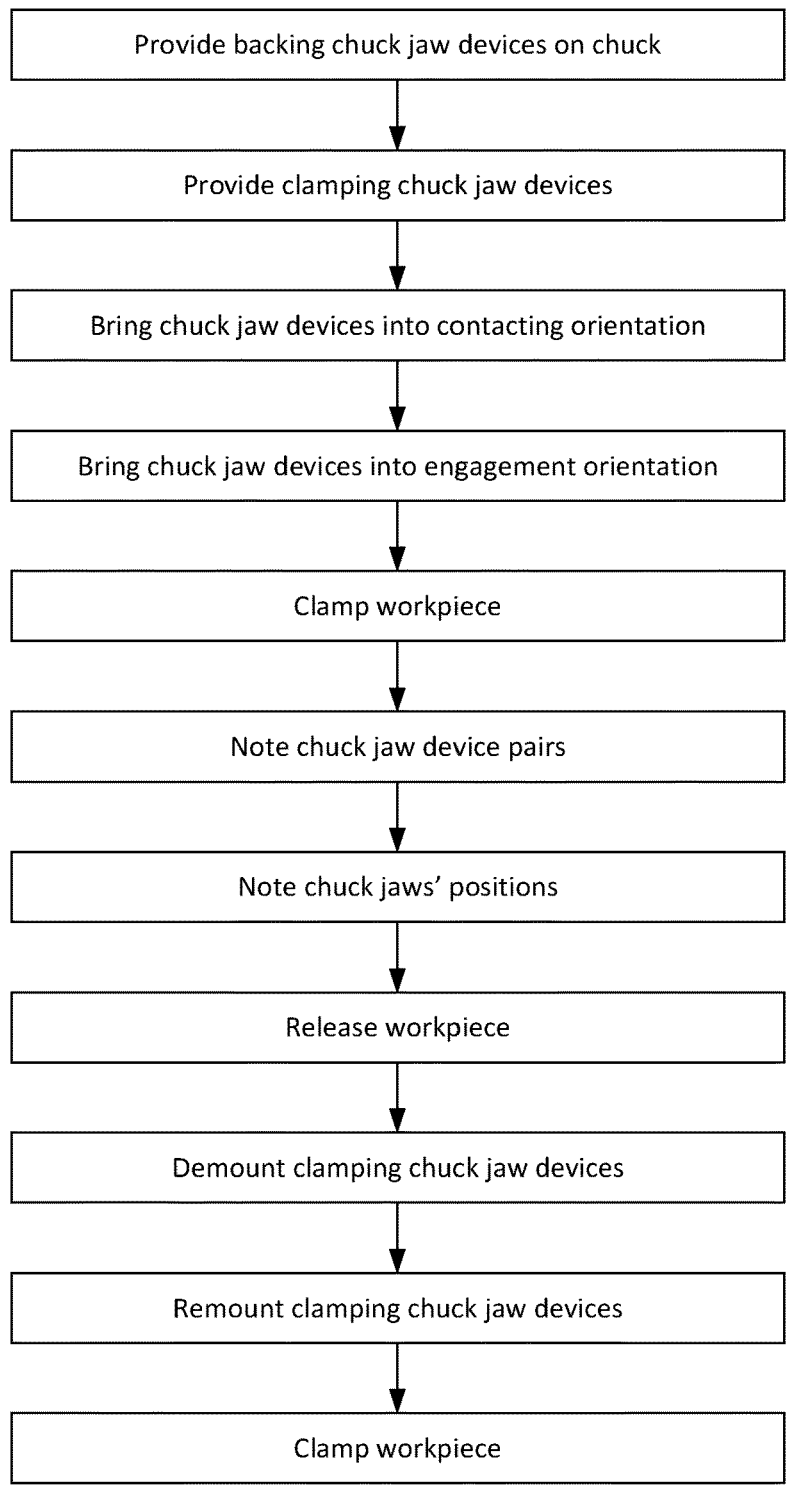
FIG. 10 is a flowchart illustrating a method according to the invention.

FIG. 10 illustrates the method steps of a method according to the present invention.

In a first step, the at least two, preferably three, backing chuck jaw parts 120 of the chuck 10 are provided and mounted on the chuck 10.

In a second step, the at least two clamping chuck jaw parts 110 are provided.

In a third step, the said clamping chuck jaw parts 110 are mounted on the respective backing chuck jaw parts 120. In this step, the respective concave structures 116 of the clamping chuck jaw parts 110 have not yet been permanently deformed as a consequence of engagement with the corresponding backing chuck jaw part 120. In other words, the respective chuck jaw part 110, 120 pairs are in their respective contacting orientation after this third step, and the clamping chuck jaw part 110 has not been in the engagement orientation before.

In a fourth step, the at least two respective chuck jaw part pairs are brought into the above described engagement orientation in relation to the other. Hence, each respective chuck jaw part 110, 120 is brought into a respective engagement with their respective contact surfaces 113, 123 in direct contact with each other, so that the said respective concave structure 116 is permanently deformed according to what has been described above.

In a fifth step, a first workpiece 12 is clamped using the chuck 10, and is thereby fixed in a predetermined position for machining or the like. This step preferably also comprises a calibration substep, in which the backing chuck jaw parts 120 are adjusted in a respective direction perpendicular to the third axis A3 so as to achieve said predetermined position. With a chuck 10 according to the present invention, such a calibration needs only be done once for each set of clamping chuck jaw parts 110. The next time a workpiece is to be clamped, the adjustment of the chuck jaws 100 along the direction perpendicular to the third axis A3 can be set directly, preferably automatically, without need for separate calibration.

In a sixth and a seventh step, the position of the respective chuck jaw 100 when the first workpiece 12 is clamped by the chuck 10 is noted, as well as the positions of the backing chuck jaw parts 120, in the said respective direction perpendicular to the third axis A3. At least the latter noting can be accomplished automatically, by a CNC machine or the like, in which the chuck 10 is used, measuring and storing electronically the adjustment positions of the backing chuck jaw parts 120.

In an eighth step, the first workpiece 12 is released.

In a ninth step, the clamping chuck jaw parts 110 are demounted from the respective backing chuck jaw parts 120.

In a tenth step, which may be performed at a later point, and in particular after use of the chuck 10 with its backing chuck jaw parts 120 for similar or other purposes and together with other sets of clamping chuck jaw parts, the originally used set of clamping chuck jaw parts 110 are again mounted on the same respective corresponding backing chuck jaw parts 120.

Finally, in an eleventh step, the same workpiece 12, or another workpiece, is again clamped by the chuck 10.

Preferably, in the clamping in the tenth step, the respective chuck jaw 110 is caused to return to the position, in the respective direction perpendicular to the third axis A3, previously noted in the seventh step.

However, at least one clamping chuck jaw part 110 may be rotated about its respective second central axis A2 as compared to its respective position after the fourth step, depending on the geometry of the workpiece which is clamped in the eleventh step.

Above, preferred embodiments have been described. However, it is apparent to the skilled person that many modifications can be made to the described embodiments without departing from the basic idea of the invention.

For instance, the shape of the chuck jaw parts 110, 120 may differ from the ones illustrated in the figures.

Also, the backing chuck jaw parts 120 may be more complex, or feature other types of adjustment means, than illustrated in the figures and described above.

Hence, the invention is not to be considered limited to the described embodiments, but may be varied across the full scope of the enclosed claims.

The invention claimed is:

1. Backing chuck jaw part having a first central axis and a contact surface perpendicular to said first central axis, which backing chuck jaw part is arranged to engage with a clamping chuck jaw part having a second central axis, in which engagement the contact surface is arranged in contact with a corresponding contact surface on said clamping chuck jaw part so as to together form a chuck jaw for a chuck, wherein the backing chuck jaw part is manufactured from a harder metal material than a metal material from which the clamping chuck jaw part is manufactured, a cross-section of the backing chuck jaw part along said first central axis comprises a convex structure, and the convex structure is arranged to engage with a corresponding concave structure of a cross-section along said second central axis of the clamping chuck jaw part so that the said concave structure is permanently deformed as a result of an engagement between said convex and said concave structures resulting from the backing and clamping chuck jaw parts first being arranged in a contacting orientation, wherein the first and second central axes, respectively, are aligned with each other and the respective contact surfaces are facing each other, and thereafter being pressed together into an engagement orientation, in which contact is established between said contact surfaces.

2. Backing chuck jaw part according to claim 1, wherein the backing chuck jaw part is manufactured from annealed steel having a hardness of at least 250 HB, preferably between 250 and 300 HB.

3. Backing Chuck jaw part according to claim 1, wherein both the convex structure and the concave structure are at least partly rotationally symmetric about the first and second central axis, respectively.

4. Backing Chuck jaw part according to claim 1, wherein the convex structure comprises an edge with a radius of curvature of between 1 and 5 mm, preferably of between 2 and 3 mm, preferably of about 2.5 mm.

5. Backing Chuck jaw part according to claim 1, wherein the concave structure comprises a surface which is inclined in relation to the second central axis, preferably with an angle of inclination of between 15° and 40°, so that the convex structure strikes the said surface when the chuck jaw parts are brought into said contact orientation.

6. Backing Chuck jaw part according to claim 5, wherein the clamping chuck jaw part is manufactured from a steel alloy, and in that the angle of inclination is between 18° and 26°, preferably about 22°, alternatively that the clamping chuck jaw part is manufactured from an aluminium alloy, and in that the angle of inclination is between 26° and 34°, preferably about 30°.

7. Backing Chuck jaw part according to claim 1, wherein the backing chuck jaw part comprises an indentation and the clamping chuck jaw part comprises a corresponding protrusion, and in that an envelope surface of the said indentation is arranged to come into direct contact with an envelope surface of the said protrusion when the chuck jaw parts are in the said engagement orientation.

8. Backing Chuck jaw part according to claim 7, wherein the said envelope surfaces are rotational symmetric about the respective first and second central axis, and in that the said envelope surfaces are arranged to come into direct contact along their entire respective angular extent when the chuck jaw parts are in the said engagement orientation.

9. Backing Chuck jaw part according to claim 7, wherein the said convex structure is constituted by an outer delimiting edge of said indentation.

10. Backing Chuck jaw part according to claim 1, wherein the chuck jaw parts are arranged so that a certain play, of between 0.05 and 0.25 mm, preferably between 0.10 and 0.15 mm, preferably about 0.12 mm, between the said contact surfaces is present when the chuck jaw parts are arranged in said contact orientation.

11. Chuck jaw comprising a backing chuck jaw part according to claim 1 and a clamping chuck jaw part having a second central axis and a contact surface perpendicular to said second central axis, which clamping chuck jaw part is arranged to engage with the backing chuck jaw part.

12. Chuck jaw according to claim 11, wherein the chuck jaw further comprises a screw means arranged to impart the said pressing force pressing the chuck jaw parts towards each other in order to achieve said engagement orientation, and in that the chuck jaw is arranged so that a screw means moment of between 60-90 NM, preferably between 70-75 NM, is required for the said contact to be established.

13. Chuck jaw according to claim 11, wherein the chuck jaw is indexed, so that said engagement between the chuck jaw parts is arranged so that the clamping chuck jaw part can be turned in relation to the backing chuck jaw part about the second central axis so as to assume one of a number of predetermined rotational positions, and in that the clamping chuck jaw part is arranged with different clamping radii for different ones of said rotational positions.

14. Chuck comprising at least two chuck jaws according to claim 11, wherein the chuck is associated with a third central axis, and in that the chuck further comprises a respective radial setting means for each respective jaw, arranged to act on the backing chuck jaw part of the chuck jaw in question and allow it to be set radially in relation to said third central axis.

15. Clamping chuck jaw part having a second central axis and a contact surface perpendicular to said second central axis, which clamping chuck jaw part is arranged to engage with a backing chuck jaw part having a first central axis, in which engagement the contact surface is arranged in contact with a corresponding contact surface on said backing chuck jaw part so as to together form a chuck jaw for a chuck, wherein the backing chuck jaw part is manufactured from a harder metal material than a metal material from which the clamping chuck jaw part is manufactured, a cross-section of the clamping chuck jaw part along said second central axis comprises a concave structure, and the concave structure is arranged to engage with a corresponding convex structure of a cross-section along said first central axis of the backing chuck jaw part so that the said concave structure is arranged to be permanently deformed as a result of an engagement between said convex and said concave structures resulting from the backing and clamping chuck jaw parts first being arranged in a contacting orientation, wherein the first and second central axes, respectively, are aligned with each other and the respective contact surfaces are facing each other, and thereafter being pressed together into an engagement orientation, in which contact is established between said contact surfaces.

16. Clamping chuck jaw part according to claim 15, wherein the clamping chuck jaw part is either manufactured from a steel alloy having a hardness of at the most 250 HB, preferably between 100 and 250 HB, or from an aluminium alloy having a hardness of at the most 250 HB, preferably at the most 100 HB, preferably between 50 and 100 HB.

17. Clamping Chuck jaw part according to claim 15, wherein both the convex structure and the concave structure are at least partly rotationally symmetric about the first and second central axis, respectively.

18. Clamping Chuck jaw part according to claim 15, wherein the convex structure comprises an edge with a radius of curvature of between 1 and 5 mm, preferably of between 2 and 3 mm, preferably of about 2.5 mm.

19. Clamping Chuck jaw part according to claim 15, wherein the concave structure comprises a surface which is inclined in relation to the second central axis, preferably with an angle of inclination of between 15° and 40°, so that the convex structure strikes the said surface when the chuck jaw parts are brought into said contact orientation.

20. Clamping Chuck jaw part according to claim 15, wherein the backing chuck jaw part comprises an indentation and the clamping chuck jaw part comprises a corresponding protrusion, and in that an envelope surface of the said indentation is arranged to come into direct contact with an envelope surface of the said protrusion when the chuck jaw parts are in the said engagement orientation.

21. Clamping Chuck jaw part according to claim 15, wherein the chuck jaw parts are arranged so that a certain play, of between 0.05 and 0.25 mm, preferably between 0.10 and 0.15 mm, preferably about 0.12 mm, between the said contact surfaces is present when the chuck jaw parts are arranged in said contact orientation.

* * * * *